(12) United States Patent
Meijer et al.

(10) Patent No.: US 8,347,266 B2
(45) Date of Patent: Jan. 1, 2013

(54) DECLARATIVE OBJECT IDENTITY

(75) Inventors: Henricus J. Meijer, Mercer Island, WA (US); Amanda K. Silver, Seattle, WA (US); Paul A. Vick, Jr., Seattle, WA (US); Timothy Y. Ng, Bellevue, WA (US); Harish V. Kantamneni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 11/953,079

(22) Filed: Dec. 10, 2007

(65) Prior Publication Data

US 2009/0150864 A1   Jun. 11, 2009

(51) Int. Cl.
*G06F 9/44* (2006.01)

(52) U.S. Cl. ....................................... 717/116

(58) Field of Classification Search .................... None
See application file for complete search history.

(56) References Cited

U.S. PATENT DOCUMENTS

| | | | | |
|---|---|---|---|---|
| 4,558,413 | A * | 12/1985 | Schmidt et al. | 717/170 |
| 6,502,112 | B1 | 12/2002 | Baisley | |
| 6,766,514 | B1 * | 7/2004 | Moore | 717/159 |
| 6,925,638 | B1 * | 8/2005 | Koved et al. | 717/155 |
| 6,993,744 | B2 | 1/2006 | Hills | |
| 7,171,655 | B2 * | 1/2007 | Gordon et al. | 717/146 |
| 2003/0074634 | A1 | 4/2003 | Emmelmann | |
| 2003/0131348 | A1 * | 7/2003 | Hogstrom et al. | 717/166 |
| 2004/0039746 | A1 * | 2/2004 | Bracha | 707/100 |
| 2004/0088687 | A1 * | 5/2004 | Dalton et al. | 717/141 |
| 2004/0181544 | A1 | 9/2004 | Anderson | |
| 2005/0108206 | A1 * | 5/2005 | Lam et al. | 707/3 |
| 2006/0047652 | A1 | 3/2006 | Pandit et al. | |
| 2006/0265705 | A1 * | 11/2006 | Holt | 717/169 |
| 2007/0027862 | A1 | 2/2007 | Meijer et al. | |
| 2007/0028212 | A1 | 2/2007 | Meijer et al. | |
| 2007/0028223 | A1 * | 2/2007 | Meijer et al. | 717/140 |
| 2007/0044080 | A1 | 2/2007 | Vick et al. | |
| 2007/0168949 | A1 * | 7/2007 | Shattuck et al. | 717/115 |
| 2008/0222602 | A1 * | 9/2008 | Vaziri-Farahani et al. | 717/116 |
| 2009/0296922 | A1 * | 12/2009 | Smeets et al. | 380/28 |

OTHER PUBLICATIONS

"Tim Ng", Date: Nov. 7, 2007, http://blogs.msdn.com/timng/rss.xml.
"Visual Basic", Date: Nov. 20, 2007, http://www.panopticoncentral.net/category/2.aspx/rss.
Meijer, et al., "Visual Studio Developer Center", Date: Feb. 2007, Microsoft Corporation, http://msdn2.microsoft.com/en-us/library/ms364068(VS.80).aspx#vb9overview_topic5.
".NET Framework Developer Center", downloaded from <http://msdn2.microsoft.com/en-us/library/system.object.gethashcode.aspx>, published 2007, downloaded on Aug. 30, 2007, 7 pages.

(Continued)

*Primary Examiner* — Anil Khatri
*Assistant Examiner* — Adam R Banes (57) ABSTRACT

Systems and methods are described that enhance a programming language by introducing support for declarative object identity in both class declarations and object literals. An exemplary system includes a memory that stores code associated with a computer program and a component coupled to the memory. The component is configured to access the code, to identify a variable in the code and a modifier associated with the variable and, responsive to identifying the variable, to use the variable to determine the identity of an object associated with the variable and to determine whether the object is equal to another object based on value semantics.

17 Claims, 7 Drawing Sheets

OTHER PUBLICATIONS

"Mutable and Immutable Anonymous Types, and Keys", downloaded from <http://www.panopticoncentral.net/archive/2007/05/11/20566.aspx>, published May 11, 2007, downloaded on Aug. 30, 2007, 7 pages.

Vaziri, et al., "Declarative Object Identity Using Relation Types", ECOOP 2007—object-oriented programming: 21st European conference, Berlin, Germany, Jul. 30-Aug. 3, 2007, downloaded on Jan. 16, 2012, pp. 54-78.

* cited by examiner

DECLARATIVE OBJECT IDENTITY

BACKGROUND

Object identity and equality are important concepts in computer programming. Every programming language must provide some method for determining the identity of an object and for determining whether two objects are equal.

In relational databases, object identity is encoded via the notion of primary keys. Two rows are considered the same if their primary keys are equal. This assumes, of course, that recursively that question can be answered.

In contrast, in imperative and object-oriented languages, object instances are ultimately identified by their address in memory, which represents their "identity." For example, in the following segment of Visual Basic code, both variables X and Y refer to the same object in memory and therefore have the same "reference identity" (in Visual Basic, a test for reference identity may be performed using "Is"):

Dim X=New Person With {.Name="Paul"}
Dim Y=X
Assert(X Is Y)
Y.Name="Amanda"
Assert(X.Name="Amanda")

Because X and Y have the same reference identity, a change to the Name property via variable Y is visible when accessing the Name property via variable X.

In many situations, it is useful to provide a second notion of equality for objects that is based on the value of objects as opposed to their location in memory. For instance, the variable P and Q below point to two different Person instances:

Dim P=New Person With {.Name="Tim"}
Dim Q=New Person With {.Name="Tim"}
Assert(P=Q)
Assert(P IsNot Q)

However, a software developer may wish to consider two Person instances to be the same whenever the .Name properties associated with those instances are the same, so in this case, the programmer may want to assert that P is the same as Q using the =operator.

In some programming languages, programmers can redefine equality on their objects. For example, Microsoft® .NET™ programming languages allow programmers to redefine equality on their objects by overriding the following two virtual methods on the Object class which is at the root of the type hierarchy:

Public Overridable Function Equals (obj As Object) As Boolean
Public Overridable Function GetHashCode( ) As Integer Other languages/runtimes provide similar protocols. The standard contract in the .NET framework for the Equals and GetHashCode functions is that they satisfy the following rather intricate properties:

(1) x.Equals(x) returns true, except in cases that involve floating-point types;
(2) x.Equals(y) returns the same value as y.Equals(x);
(3) x.Equals(y) returns true if both x and y are NaN;
(4) (x.Equals(y) && y.Equals(z)) returns true if and only if x.Equals(z) returns true;
(5) Successive calls to x.Equals(y) return the same value as long as the objects referenced by x and y are not modified;
(6) x.Equals(a null reference (Nothing in Visual Basic)) returns false;
(7) If two objects compare as equal, the GetHashCode method for each object must return the same value. However, if two objects do not compare as equal, the GetHashCode methods for the two object do not have to return different values;
(8) The GetHashCode method for an object must consistently return the same hash code as long as there is no modification to the object state that determines the return value of the object's Equals method. Note that this is true only for the current execution of an application, and that a different hash code can be returned if the application is run again. For the best performance, a hash function must generate a random distribution for all input.

However, overriding Equals and GetHashCode in this manner is not always possible, typically involves incorporating a substantial amount of boiler plate code, and provides ample opportunity for introducing bugs. Furthermore, programming languages that utilize such object contracts do not typically provide any method of collapsing the notions of equality and identity outside of modifying the execution engine itself.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein that enhance a programming language by introducing support for declarative object identity in both class declarations and object literals.

One system described herein includes a memory that stores code associated with a computer program and a component coupled to the memory. The component may comprise, for example, a language-dependent compiler, a language-independent compiler or a virtual machine. The component is configured to access the code and to identify a variable in the code and a modifier associated with the variable. For example, the component may be configured to identify a class declaration that includes the variable and the modifier associated with the variable. Alternatively or additionally, the component may be configured to identify an object literal that includes the variable and a modifier associated with the variable. The modifier may comprise for example a programming language keyword or a custom attribute.

Responsive to identifying the variable, the component is further configured to use the variable to determine the identity of an object associated with the variable and to determine whether the object is equal to another object based on value semantics. The component may be configured to perform these functions by providing an implementation of an Equals virtual method and a GetHashCode virtual method that are based on the variable and that satisfy a required contract associated with the virtual methods.

A method for processing code associated with a computer program is also described herein. In accordance with this method, a class declaration is identified in the code that includes a variable and a modifier associated with the variable. Responsive to identifying the class declaration, the variable is used to determine the identity of an object within the class and the variable is also used to determine whether an object within the class is equal to another object based on value semantics. Using the variable in the aforementioned-manner may include providing an implementation of an Equals virtual method and a GetHashCode virtual method for the class that are based on the variable and that satisfy a required contract associated with the virtual methods.

The foregoing method may further include, responsive to identifying the class declaration, implementing at least one constraint with respect to the variable. The at least one constraint may include requiring that the variable be immutable. Alternatively, the at least one constraint may include requiring that the variable be immutable or, if the variable is a reference type, performing a recursive function to ensure that the reference type includes a like variable that is required to be immutable. Still further, the at least one constraint may include, if the variable is a generic type parameter, then requiring that the variable be immutable, or that the generic type have a like variable that is required to be immutable.

An alternative method for processing code is also described herein. In accordance with this method, an object literal is identified that includes a variable and a modifier associated with the variable. Responsive to identifying the object literal, the variable is used to determine the identity of the object, and the variable is also used to determine whether the object is equal to another object based on value semantics. Using the variable in the aforementioned manner may include providing an implementation of an Equals virtual method and a GetHashCode virtual method for the object that are based on the variable and that satisfy a required contract associated with the virtual methods. The foregoing method may further include, responsive to identifying the class declaration, requiring that the variable be immutable.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. Introduction

Object oriented languages and runtimes must provide a way to determine if two variables are equivalent in a system. While used in many places in the system, object identity is very often leveraged in data structures for efficient storage and operations for the data structure. In general, there are two basic patterns that an object abides by—it either uses reference equality to compare the object pointers to determine if the two variables are the same, or it determines some form of identity based on the values stored in the object. The former, generally called "reference semantics," implies that any two instances of an object are not equivalent. For the latter, "value semantics," two instances of an object may be interchangeable based on the values they store.

In many conventional systems (most notably, conventional systems implemented using the Microsoft® .NET™ framework or the Sun Microsystems® Java Virtual Machine (JVM™)), the object contract includes interfaces for two methods that allow the object to define if reference or value semantics should be used for object identity. Specifically, these methods are Equals, which compares two variables, and GetHashCode which produces a unique ID for each distinct identity of an object.

When an object is declared, it needs to determine exactly how to define its identity. In some cases, all of the values that the type stores contribute to the object's identity, in some cases none do (in which case, that object has reference semantics), and in other cases—only some of the values contribute to the object's identity. This is done by implementing the methods above which is difficult and very often error prone.

An embodiment of the present invention provides a declarative way to demarcate which values should contribute to an object's identity for both class declarations and object literals.

As used herein, the terms "component," "system" and the like are intended to refer to a computer-related entity, which may comprise hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor-based device to implement aspects detailed herein. The term computer program as used herein is intended to encompass a computer program accessible from any computer-readable device, carrier or media. For example, computer-readable media can include but are not limited to magnetic storage device (e.g., hard disk, floppy disk, magnetic strips, or the like), optical disks (e.g., compact disk (CD), digital versatile disk (DVD), or the like), smart cards and flash memory devices.

B. Exemplary Programming Environment

Figure 1:
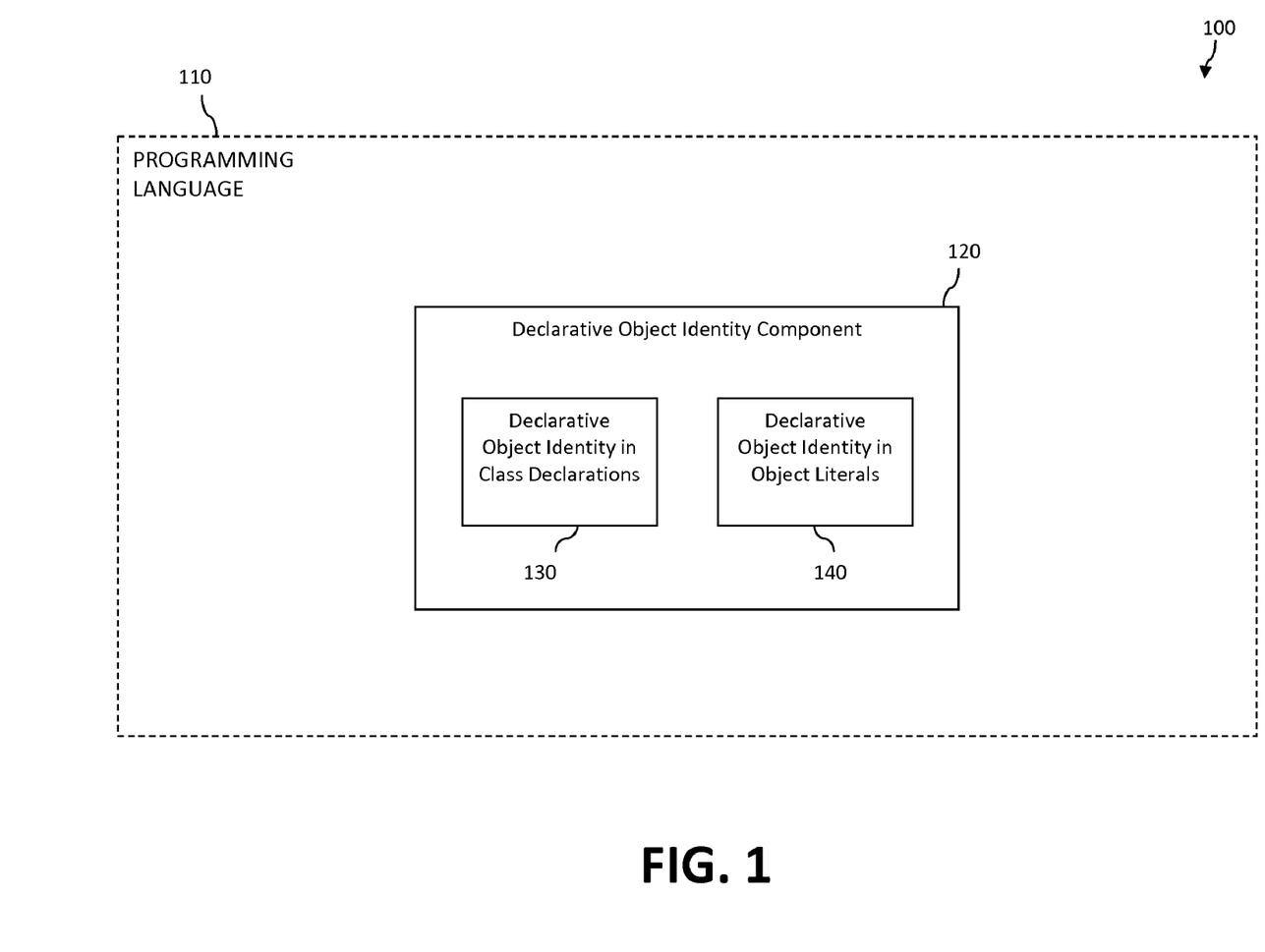
FIG. 1 depicts an exemplary programming environment in accordance with an embodiment of the present invention.

FIG. 1 depicts an exemplary programming environment 100 in accordance with an embodiment of the present invention. Programming environment 100 includes a programming language 110 that provides an interface by which a software developer may declare and/or instantiate one or more data structures. As shown in FIG. 1, programming language 110 is enhanced with a declarative object identity component 120 that allows the software developer to include syntax for declaring object identity in class declarations and object literals. To this end, declarative object identity component 120 includes a first interface 130 that supports the inclusion of object identity declarations in class declarations and a second interface 140 that supports object identity declarations in object literals. Each of first interface 130 and second interface 140 will now be described.

1. Declarative Object Identity in Class Declarations

In accordance with one embodiment of the present invention, first interface 130 of programming language 110 allows a software developer to declare a class, wherein declaring the class includes selectively designating which instance variable or variables associated with the class should be used to determine the identity of an object within the class as well as to determine whether an object within the class is equal to another object based on value semantics.

For example, in one embodiment of the present invention, interface 130 allows a software developer to selectively designate which instance variable(s) associated with the class should be used to determine object identity and equality by using a modifier in association with the selected variable(s). The modifier may be, for example, the term "Key," although the invention is not so limited. Thus, in one exemplary implementation a software developer may define a class "Person" that includes a variable "Name," wherein the variable "Name" is used by the compiler to determine object identity and equality, as follows:
Class Person
Public Key Dim Name as String
End Class Responsive to the designation of the instance variable(s) by the software developer, the compiler automatically implements notions of identity and equality for objects within the class that are based solely on the designated variable(s). In one embodiment of the present invention, the compiler performs this function by automatically providing implementations of the Equals and GetHashCode virtual methods for the class that are based on the designated variable(s) and that satisfy the required contract for these methods.

In one embodiment of the present invention, the variable(s) that are designated for use in determining identity and equality are required to be immutable. If this were not the case, then the value of an object used for determining equality could change during program execution, which could cause problems. For example, for programming languages that implement the GetHashCode virtual method, if the designated variable(s) were mutable, then the value of GetHashCode for an object within the class could change during program execution (which is legal according to the contract for Equals and GetHashCode). This would lead to problems if the value of the object is used as a key in a hash table. For example, the Assert method in the following segment of code will fail because the value of the "Name" Variable associated with the instance P of the "Person" Class is changed from "Amanda" to "Paul":
Dim P=New Person With {.Name="Amanda"}
Dim D=New Hash Table( )
D(P)=4711
P.Name="Paul"
REM Will fail
Assert(D(P)=4711)

To address this issue, an embodiment of the present invention interprets the designation of a variable for use in determining object identity and equality to also implicitly include the designation of the variable as immutable.

However, just designating the variable as immutable may not be sufficient to ensure correctness. Consider the following implementation of the "Person" class where a variable "SSN" associated with the class is designated for use in determining identity and equality (as indicated using the modifier "Key"):
Class Person
Key Dim SSN As SSN
End Class Here, the variable "SSN" is of reference type "SSN." However, in further accordance with this example, the reference type "SSN" is itself a mutable class that defines the Equals and GetHashCode virtual methods based on the mutable variable "Value":
Class SSN
Dim Value as Decimal
End Class As a result, the Equals and GetHashCode virtual methods defined on class "Person" will not be stable. Thus, the Assert method in the following code segment will fail:
Dim SSN=New SSN With {.Value=123456789}
Dim P=New Person With {.SSN=SSN}
Dim H=P.GetHashCode( )
SSN.Value='987654321"
REM Will fail
Assert(H=P.GetHashCode( )).

To address this issue, an embodiment of the present invention requires that the variable(s) that are designated for use in determining identity and equality be immutable or, if a designated variable is a reference type, performing a recursive function to ensure that the reference type includes a similarly-designated variable which is required to be immutable. The use of a recursive function is required as a reference type may itself include other reference types.

Furthermore, an embodiment of the present invention allows generic type parameters to be designated as variables for use in determining object identity and equality. In order to achieve this, a generic constraint is used that expresses that a type is either completely immutable, or has immutable keys similar to the New constraint that specifies that a type has a default constructor:
Class Person(Of T As Key)
Key Dim X As T
End Class.

2. Declarative Object Identity in Object Literals

In accordance with one embodiment of the present invention, second interface 140 of programming language 110 allows a software developer to define an object literal, wherein defining the object literal includes selectively designating which variable or variables associated with the object literal should be used to determine the identity of the object as well as to determine whether the object is equal to another object.

Allowing this designation of variables for determining identity and equality to occur in the object literal definition provides a significant advantage in programming environments in which a software developer would otherwise be unable to override the Equals and GetHashCode virtual methods. A prime example of this is anonymous types. As will be appreciated by persons skilled in the relevant art(s), anonymous types are a convenient feature of some programming languages that enable software developers to concisely define inline types within code, without having to explicitly define a formal class declaration of the type. Using anonymous types, the compiler generates an unnamed class and then infers the properties of the class from the object literal.

Thus, for example, in a programming language such as Visual Basic that supports anonymous types, the following code may be use to define an object:

Dim a=New With {.x=10, .y=10.5}

This code will create an object with reference identity. This means that the object does not implement the IEquatable interface, and does not override the Equals and GetHashCode virtual methods from System.Object. Nor is there any way for the programmer to override such methods. Furthermore, each variable .x and .y has a setter and getter property and thus is mutable.

An embodiment of the present invention introduces a contextual modifier to allow a programmer to designate one or more variables of the object literal as variables to be used for determining identity and equality. For example, the modifier "Key" may be used as follows:

Dim a=New With {.x=10, Key .y=10.5}

Here, the "Key" modifier indicates that the variable that it decorates should be considered part of the identity of the object and should be immutable. As a result, the compiler will generate an anonymous type that implements IEquatable and that provides value semantics for object identity. The anonymous type generated by the compiler will also override the Equals and GetHashhCode virtual methods from System.Object and implement them using the variables designated by the modifier "Key."

In accordance with an embodiment of the invention, variables designated in the foregoing manner are required to be immutable. The motivation for this constraint was described in the previous section. Consequently, the compiler does not implement setter properties for such designated variables.

Also, for reasons of economy, some compilers merge anonymous types to reduce the number of such types that must be generated during compile-time. An embodiment of the present invention does not treat two object literals having different variables designated for determining identity and equality as equivalent for the purposes of anonymous type merging. Thus, for example, an embodiment of the present invention would not treat the anonymous type generated by the code Dim a=New With {.x=10, .y=10.5} as equivalent to the anonymous type generated by the code

Dim a=New With {.x=10, Key .y=10.5} as equivalent for the purposes of anonymous type merging. This is desirable since the former anonymous type does not designate .y as a variable used for determining identity and equality while the latter anonymous type does.

The following sub-sections describe other special considerations for anonymous types that are generated using object literals with variables designated for determining object identity and equality.

1. Code Generated for Anonymous Types

In accordance with an embodiment of the present invention, the compiler will synthesize a constructor for the anonymous type according to the lexical order of the variables in the anonymous type. For variables that are referenced in a later variable initializer, the compiler will synthesize temporaries for the variable value. Thus, for example, for the anonymous type defined by the statement Dim a=New With {.x=10, .y=.x+10.5, .z=20} the compiler will generate the following code:

Dim $temp_x$=10

Dim a=New $AT__1$($temp_x$, $temp_x$+10.5, 20).

Since anonymous type variables can only refer to variables that have been defined already (in lexical order), this code generation scheme is satisfactory. This code generation scheme may be used regardless of whether the variables are designated for use in determining identity and equality or not.

2. Relation to Query

Some programming languages include support for language-integrated queries (sometimes called "query comprehensions."). For example, a language-integrated query may be programmed as follows:

Dim custs( ) As Customer= . . .

Dim waCusts=Select c.Name From c In custs Where c.State="WA"

A language-integrated query such as this uses object literals to represent the elements in query. In accordance with an embodiment of the present invention, when representing composite keys, the anonymous type is required to have 100% value semantics.

C. Exemplary Compile-Time Environment

Figure 2:
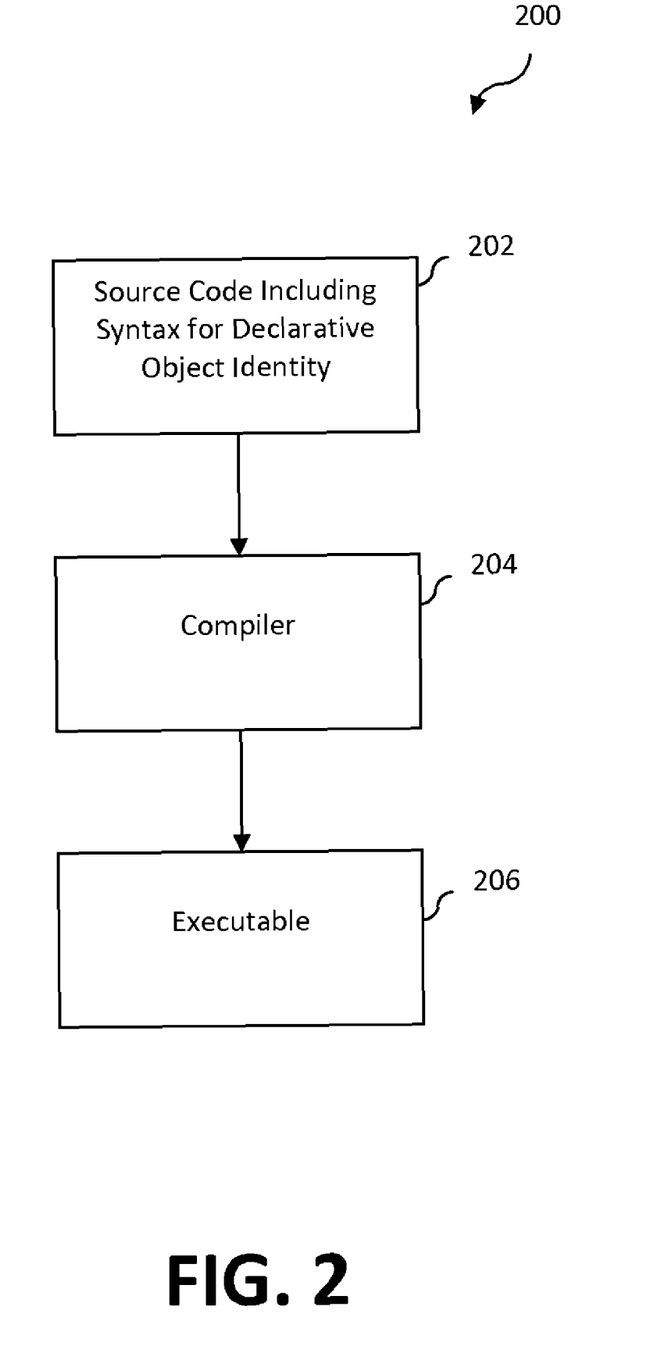
FIG. 2 is a block diagram of a compile-time environment in which an embodiment of the present invention may be implemented.

FIG. 2 is a high-level block diagram of a compile-time environment 200 in which an embodiment of the present invention may be implemented. As shown in FIG. 2, compile-time environment 200 includes a source program 202 that includes syntax for declarative object identity as discussed above. The source code may, be written, for example, in any of the Microsoft® .NET™ programming languages, such as Visual Basic .NET, C#, J#, C++/CLI, or Jscript .NET. Source program 202 may be developed, designed and/or edited using an Integrated Development Environment (IDE). The IDE may be associated, for example, with a more elaborate programming station such as a developer studio application or with a more basic tool such as a code text editor.

A compiler 204 receives and compiles source code 202 to generate an executable 206, wherein the executable comprises machine-readable code suitable for execution by a computing platform (not shown in FIG. 2). In an embodiment in which compile-time environment 200 is part of the Microsoft® .NET™ Framework, the output of compiler 204 is code rendered in a platform-neutral language termed Common Intermediate Language (CIL), which is then compiled by a Just-in-Time (JIT) Compiler (not shown in FIG. 2) to generate executable 206.

Figure 3:
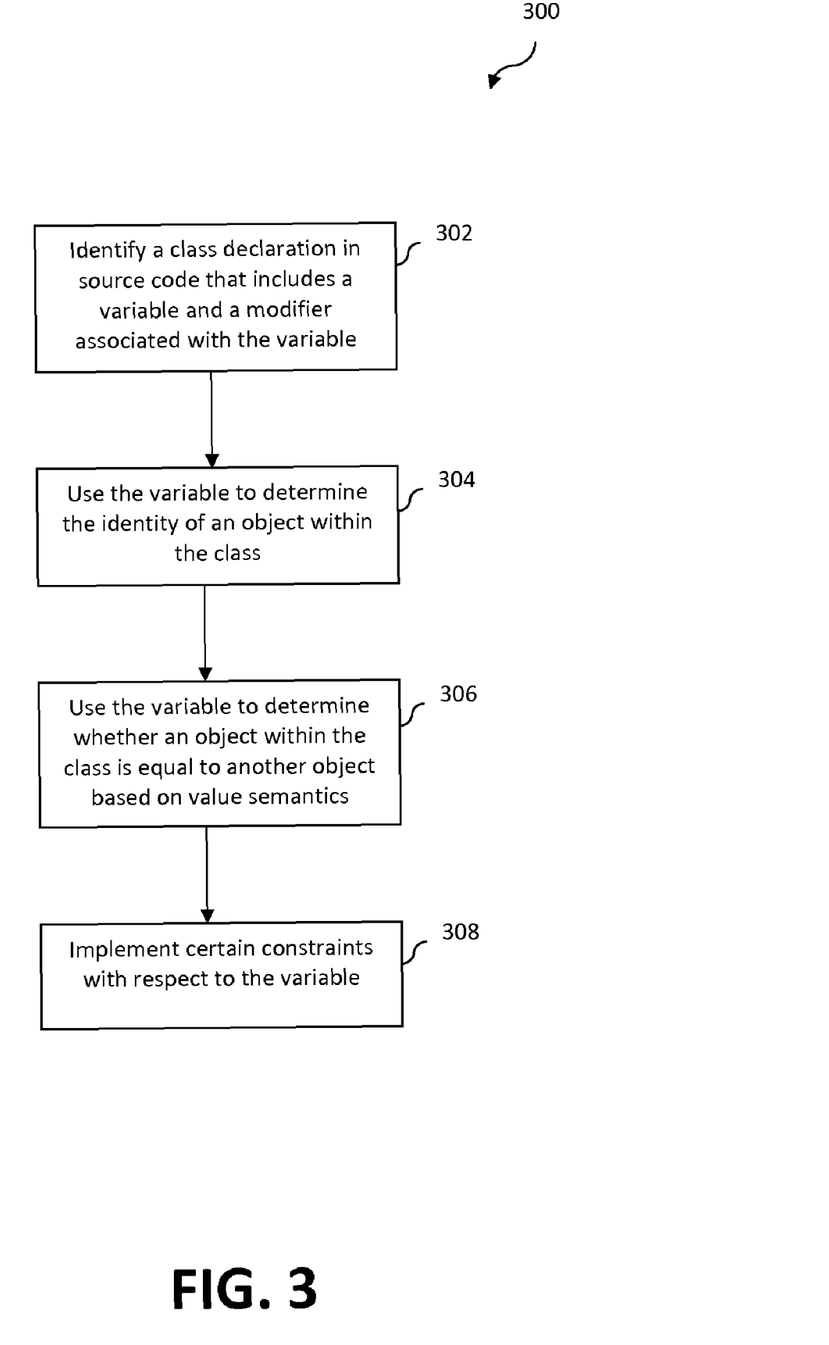
FIG. 3 depicts a flowchart of a method for compiling source code that includes syntax for declarative object identity in class declarations in accordance with an embodiment of the present invention
Figure 4:
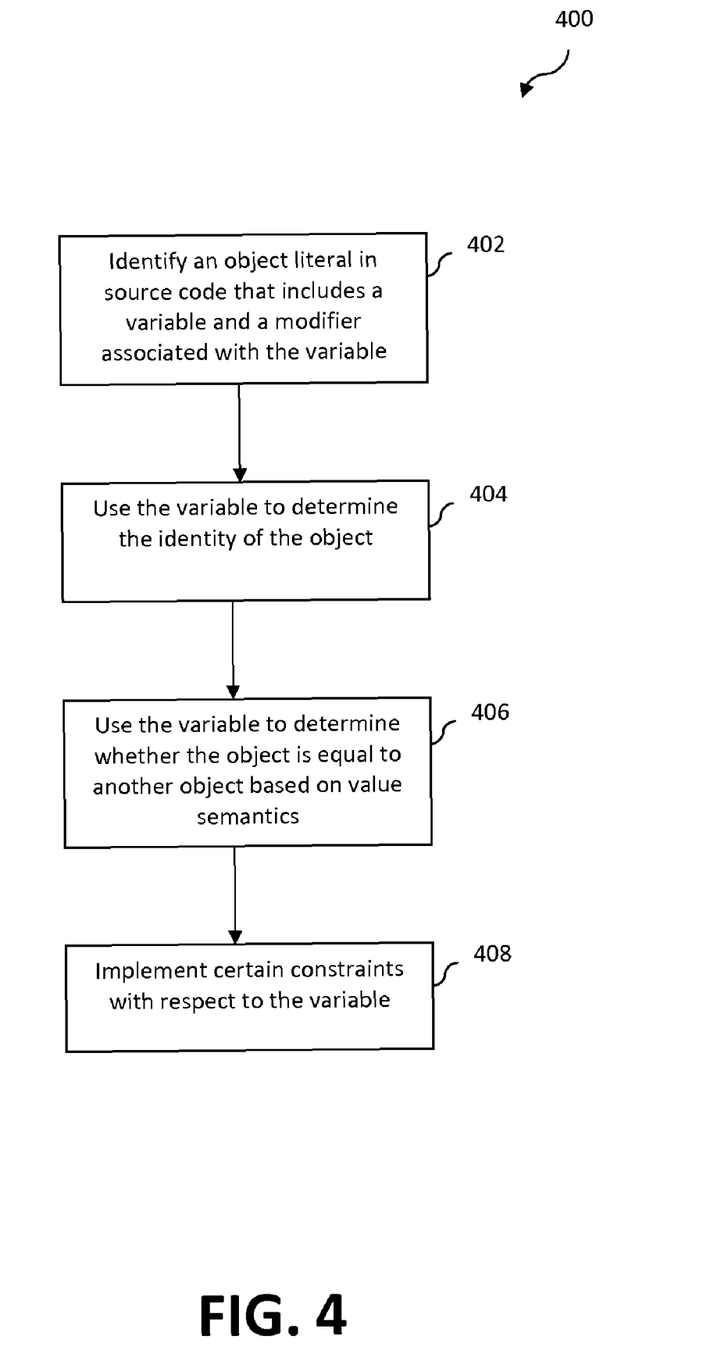
FIG. 4 depicts a flowchart of a method for compiling source code that includes syntax for declarative object identity in object literals in accordance with an embodiment of the present invention.

In accordance with an embodiment of the present invention, compiler 204 includes logic for processing the syntax for declarative object identity that is included within source code 202. The manner in which this logic operates will now be described with reference to flowchart 300 of FIG. 3 and flowchart 400 of FIG. 4. In particular, FIG. 3 depicts a flowchart 300 of a method implemented by compiler 204 for compiling source code that includes syntax for declarative object identity in class declarations in accordance with an embodiment of the present invention, while FIG. 4 depicts a flowchart 400 of a method implemented by compiler 204 for compiling source code that includes syntax for declarative object identity in object literals in accordance with an embodiment of the present invention. Although the methods of flowchart 300 and flowchart 400 will be described herein in reference to example compile-time environment 200 of FIG. 2, these methods are not limited to that implementation.

As shown in FIG. 3, the method of flowchart 300 begins at step 302, in which compiler 204 identifies a class declaration in source code 202 that includes a variable and a modifier associated with the variable. For example, the class declaration may include a variable and the word "Key" associated with the variable, although the invention is not so limited.

At step 304, responsive to identifying the class declaration in step 302, compiler 204 subsequently uses the variable to determine the identity of an object within the class. At step 306, also responsive to identifying the class declaration in step 302, compiler 204 uses the variable to determine whether an object within the class is equal to another object based on value semantics. In one embodiment of the present invention, compiler 204 performs steps 304 and 306 by automatically providing implementations of the Equals and GetHashCode virtual methods for the class that are based on the variable and that satisfy the required contract for these methods.

At step 308, also responsive to step 302, compiler 204 implements certain constraints with respect to the variable. For example, in one embodiment of the present invention, compiler 204 requires that the variable be immutable. In another embodiment of the present invention, compiler 204 requires that the variable be immutable or, if the variable is a reference type, performing a recursive function to ensure that the reference type includes a like variable that is required to be immutable. In yet another embodiment of the present invention, if the variable is a generic type parameter, then compiler 204 requires that the variable be immutable, or that the generic type have a like variable that is required to be immutable.

Although the method of flowchart 300 above is described in reference to a single variable, multiple variables may be designated with a modifier (e.g., "Key") in a class declaration as fully described elsewhere herein. In this case, during step 304 compiler 204 will use the multiple variables to determine the identity of an object, during step 306 compiler 204 will use the multiple variables to determine whether an object within the class is equal to another object within the class based on value semantics, and during step 308 compiler 204 will implement certain constraints with respect to the multiple variables. The method of flowchart 300 is described above in reference to a single variable simply to indicate that the method may be invoked by the designation of at least one variable using the appropriate modifier.

The method of flowchart 400 of FIG. 4 will now be described. As shown in FIG. 4, the method begins at step 402, in which compiler 204 identifies an object literal that includes a variable and a modifier associated with the variable. For example, the object literal may include a variable and the word "Key" associated with the variable, although the invention is not so limited.

At step 404, responsive to identifying the object literal in step 402, compiler 204 subsequently uses the variable to determine the identity of the object. At step 406, also responsive to identifying the object literal in step 402, compiler 204 uses the variable to determine whether the object is equal to another object based on value semantics. In one embodiment of the present invention, compiler 204 performs steps 404 and 406 by automatically providing implementations of the Equals and GetHashCode virtual methods for the class that are based on the variable and that satisfy the required contract for these methods. Compiler 204 may also implement an IEquatable interface based on the variable.

At step 408, also responsive to step 402, compiler 204 implements certain constraints with respect to the variable. For example, in one embodiment of the present invention, compiler 204 requires that the variable be immutable.

Although the method of flowchart 400 above is described in reference to a single variable, multiple variables may be designated with a modifier (e.g., "Key") in an object literal as fully described elsewhere herein. In this case, during step 404 compiler 204 will use the multiple variables to determine the identity of an object, during step 406 compiler 204 will use the multiple variables to determine whether the object is equal to another object based on value semantics, and during step 408 compiler 204 will implement certain constraints with respect to the multiple variables. The method of flowchart 400 is described above in reference to a single variable simply to indicate that the method may be invoked by the designation of at least one variable using the appropriate modifier.

D. Example Alternative Implementations

In accordance with an alternative implementation of the present invention, rather than using language keywords as described above, custom attribute annotations are used as the modifiers to specify which variables should be used to determine object identity and equality. As will be appreciated by persons skilled in the relevant art(s), custom attribute annotations are pieces of declarative information attached by a software developer to entities within a computer program, which are then retrieved at runtime. Such custom attribute annotations are supported, for example, by the Microsoft® .NET™ framework or the Sun Microsystems® Java Virtual Machine (JVM™).

In accordance with another alternative embodiment of the present invention, the steps performed by compiler 204 as described above in reference to flowchart 300 of FIG. 3 and flowchart 400 of FIG. 4 are instead performed by a post-processing component that operates on the object code generated by compiler 204.

Figure 5:
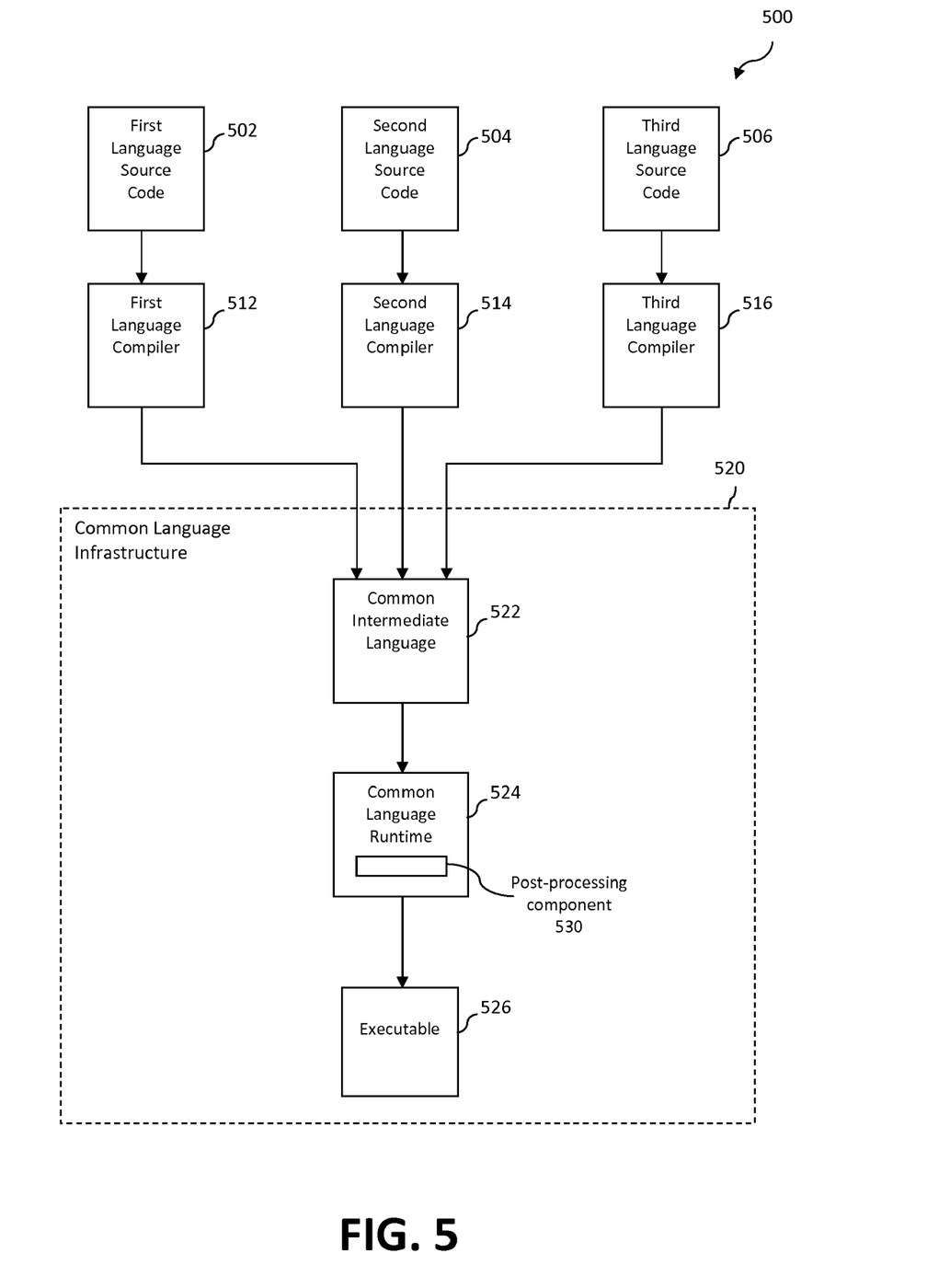
FIG. 5 is a block diagram of a Microsoft® .NET™ compile-time environment that includes a post-processing component for supporting declarative object identity in accordance with an embodiment of the present invention.

An example of such an embodiment is depicted in FIG. 5, which depicts a compile-time environment 500 that is consistent with the Microsoft® .NET™ framework. As shown in FIG. 5, compile-time environment 500 includes a first language compiler 512 that is configured to compile first language source code 502 to a platform-neutral language called Common Intermediate Language (CIL), a second language compiler 514 that is configured to compile second language source code 504 to CIL, and a third language compiler 516 that is configured to compile third language source code 506 to CIL. The first language, second language and third language are intended to represent different Microsoft® .NET™ programming languages, which include, by way of example, Visual Basic .NET, C#, J#, C++/CLI, or Jscript .NET.

As further shown in FIG. 5, compile-time environment 500 further includes a Common Language Runtime (CLR) that includes one or more components configured to compile CIL code 522 received from one or more of compilers 512, 514 and 516 to generate a machine-readable executable 526 that can be executed by a .NET virtual machine (not shown in FIG. 5). In accordance with this embodiment of the present invention, one of these components comprises a post-processing component 530 that is configured to analyze CIL code 522 to identify variables that have been designated for use in determining object identity and equality and to implement notions of object identity and equality based on those variables in a manner similar to that described above for compiler 204. However, because post-processing component 530 operates on CIL code 522, it is language-independent. Also, because post-processing component 530 operates on CIL code 522, it has more information available to it that any individual language-dependent compiler, such as compilers 512, 514 and 516.

Figure 6:
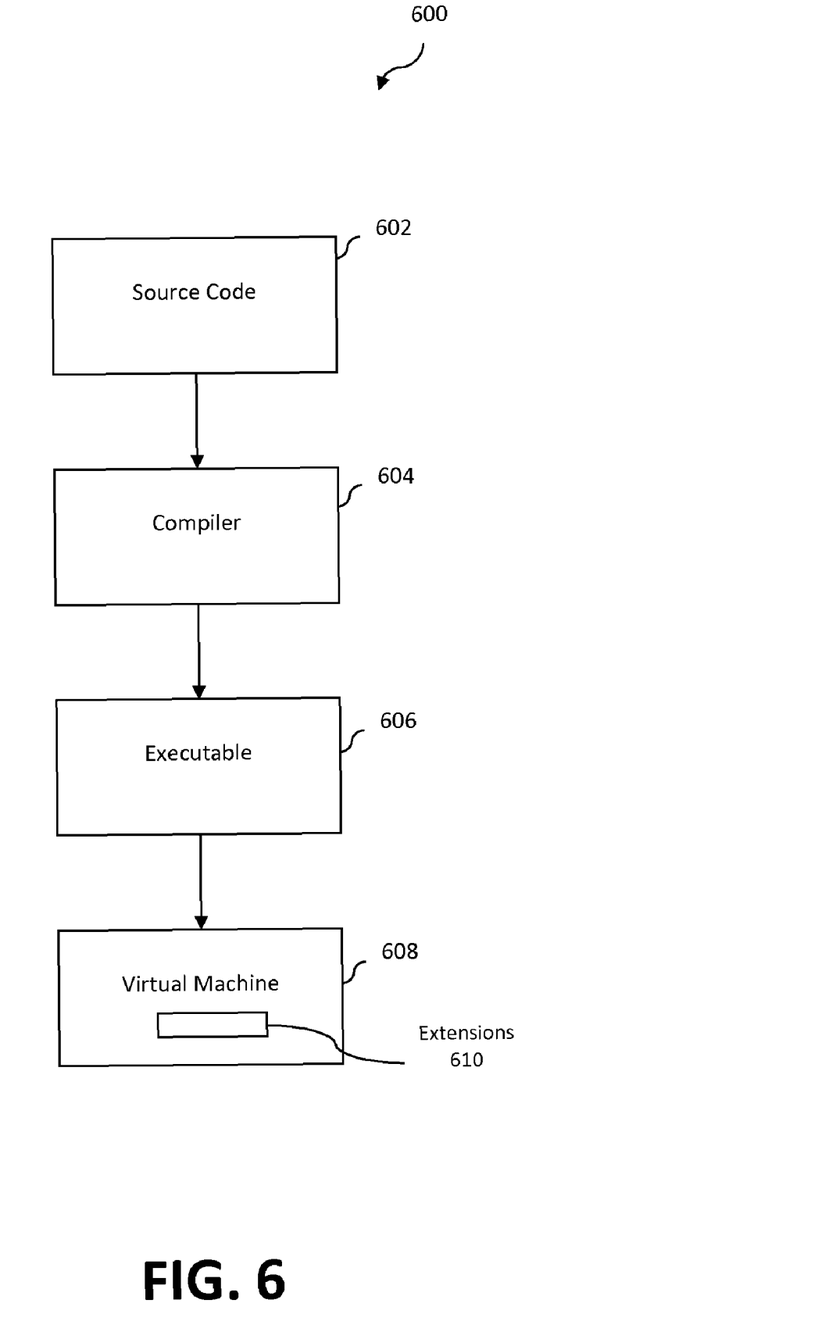
FIG. 6 is a block diagram of a computing environment that includes a virtual machine configured to support declarative object identity in accordance with an embodiment of the present invention.

In yet another alternative embodiment of the present invention, the functions of identifying variables that have been designated for use in determining object identity and equality and implementing notions of object identity and equality based on those variables is handled by the virtual machine itself. FIG. 6 depicts a high-level block diagram of a computing environment 600 that operates in this fashion.

In particular, system 600 of FIG. 6 includes a source program 602 that includes syntax or other means for indicating declarative object identity as discussed above. A compiler 604 receives and compiles source code 602 to generate an executable 606, wherein executable 606 comprises machine-readable code suitable for execution by a virtual machine 608. In an embodiment in which computing environment 600 is part of the Microsoft® .NET™ Framework, the output of compiler 604 is code rendered in CIL, which is then compiled by a JIT Compiler (not shown in FIG. 6) to generate executable 606.

In accordance with an embodiment of the present invention, virtual machine 608 includes extensions that are configured to analyze executable 606 to identify variables that have been designated for use in determining object identity and equality and to implement notions of object identity and equality based on those variables in a manner similar to that described above for compiler 204, except that the notions are implemented at runtime. This is advantageous because, as compared to other components within computing environment 600, virtual machine 608 typically has the most current information available to it. Also, like the embodiment described above in reference to FIG. 5, this allows the declarative object identity features of the present invention to be handled in a language-independent manner.

E. Example Computer System Implementation

Figure 7:
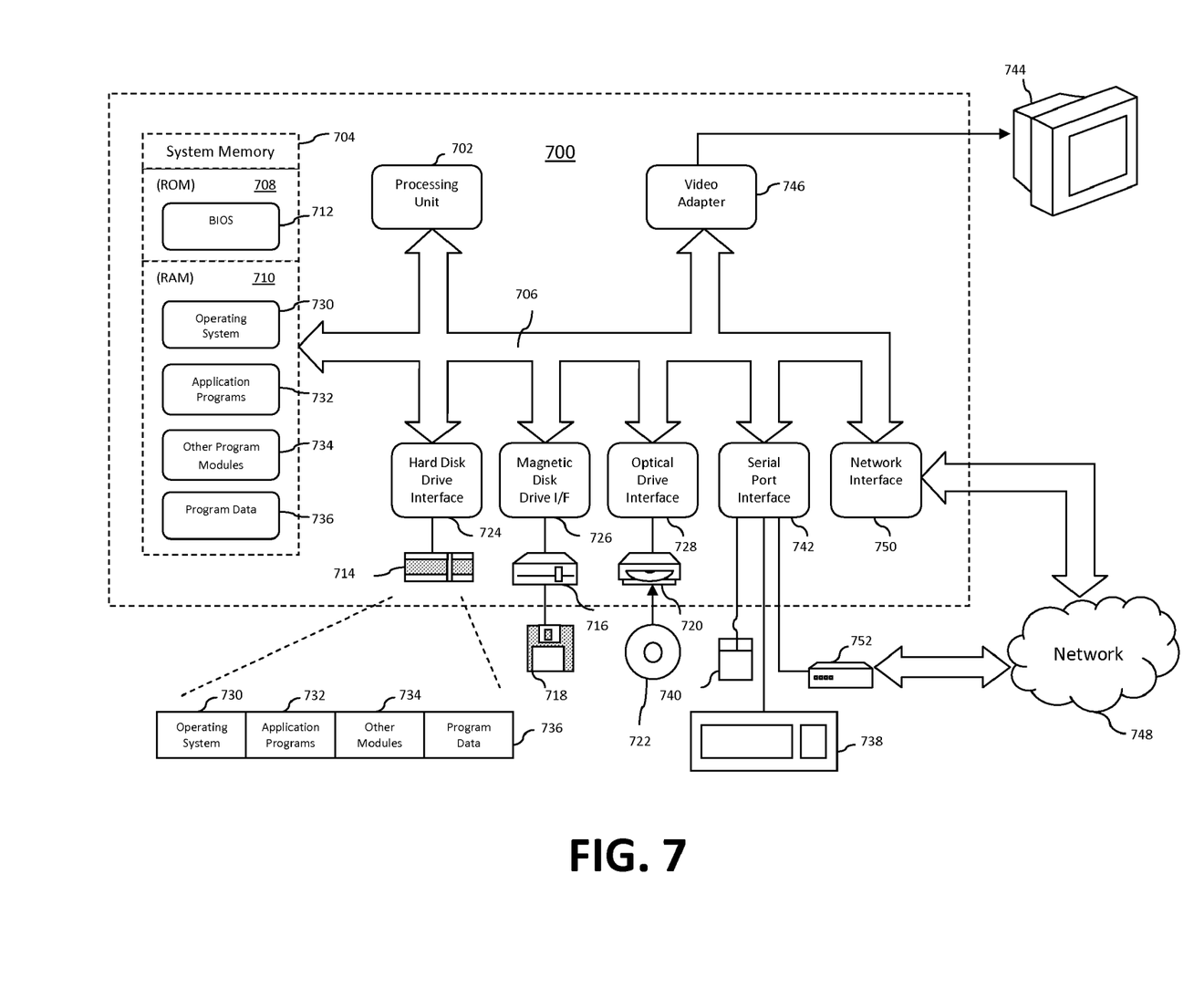
FIG. 7 depicts an example server computer that may be used to implement a commerce platform and/or database server in accordance with an embodiment of the present invention.

FIG. 7 depicts an exemplary implementation of a computer 700 upon which various aspects of the present invention may be executed. Computer 700 is intended to represent a general-purpose computing device in the form of a conventional personal computer.

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the server computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, logic for implementing one or more of the elements of programming environment 100 of FIG. 1, compile-time environment 200 of FIG. 2, compile-time environment 500 of FIG. 5, or computing environment 600 of FIG. 6. Application programs 732 or program modules 734 may also include, for example, logic for implementing one or more of the steps of flowchart 300 of FIG. 3 or flowchart 400 of FIG. 4.

A user may enter commands and information into computer 700 through input devices such as keyboard 738 and pointing device 740. Other input devices (not shown) may include a microphone, joystick, game pad, satellite dish, scanner, or the like. These and other input devices are often connected to the processing unit 702 through a serial port interface 742 that is coupled to bus 706, but may be connected by other interfaces, such as a parallel port, game port, or a universal serial bus (USB).

A monitor 744 or other type of display device is also connected to bus 706 via an interface, such as a video adapter 746. Monitor 744 is used to present a graphical user interface that assists a user/operator in configuring computer 700. In addition to the monitor, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like.

As noted above, computer programs (including application programs 732 and other program modules 734) may be stored on the hard disk, magnetic disk, optical disk, ROM, or RAM. Such computer programs may also be received via network interface 750 or serial port interface 742. Such computer programs, when executed, enable computer 700 to implement features of the present invention discussed herein. Accordingly, such computer programs represent controllers of computer 700.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system comprising:
    a memory that stores code associated with a computer program; and
    a component coupled to the memory, the component configured to access the code, to identify a variable in the code and a modifier associated with the variable, the modifier designating that the variable is to be used for determining the identity of an object associated with the variable and for determining whether the object is equal to another object based on value semantics, and, responsive to identifying the variable and the modifier associated with the variable, to use the variable to determine the identity of the object associated with the variable and to determine whether the object is equal to the other object based on value semantics,
    the component being configured to use the variable to determine the identity of the object and to determine whether the object is equal to the other object based on value semantics by automatically overriding an Equals virtual method and a GetHashCode virtual method such that the overridden Equals virtual method and the overridden GetHashCode virtual method are implemented using the variable and satisfy a required contract associated with the virtual methods.

2. The system of claim 1, wherein the component is configured to identify a class declaration in the code that includes the variable and the modifier associated with the variable.

3. The system of claim 1, wherein the component is configured to identify an object literal in the code that includes the variable and the modifier associated with the variable.

4. The system of claim 1, wherein the component is further configured to require that the variable be immutable.

5. The system of claim 1, wherein the modifier is one of a programming language keyword or a custom attribute.

6. The system of claim 1, wherein the component comprises one of:
    a language-dependent compiler;
    a language-independent compiler; or
    a virtual machine.

7. A method for processing code associated with a computer program, comprising:
    identifying a class declaration in the code that includes a variable and a modifier associated with the variable, the modifier designating that the variable is to be used for determining the identity of an object within the class, and for determining whether the object within the class is equal to another object based on value semantics; and
    responsive to identifying the class declaration that includes the variable and the modifier associated with the variable:
        using the variable to determine the identity of the object within the class, and
        using the variable to determine whether the object within the class is equal to the other object based on value semantics,
        said using the variable to determine the identity of the object within the class and said using the variable to determine whether the object within the class is equal to the other object based on value semantics comprising automatically overriding an Equals virtual method and a GetHashCode virtual method such that the overridden Equals virtual method and the overridden GetHashCode virtual method are implemented using the variable and satisfy a required contract associated with the virtual methods.

8. The method of claim 7, further comprising:
    responsive to identifying the class declaration that includes the variable and the modifier associated with the variable, implementing at least one constraint with respect to the variable.

9. The method of claim 7, wherein implementing at least one constraint with respect to the variable comprises:
    requiring that the variable be immutable.

10. The method of claim 7, wherein implementing at least one constraint with respect to the variable comprises:
    requiring that the variable be immutable or, if the variable is a reference type, performing a recursive function to ensure that the reference type includes a like variable that is required to be immutable.

11. The method of claim 7, wherein implementing at least one constraint with respect to the variable comprises:
    if the variable is a generic type parameter, then requiring that the variable be immutable, or that the generic type have a like variable that is required to be immutable.

12. The method of claim 7, wherein the modifier is one of a programming language keyword or a custom attribute.

13. The method of claim 7, wherein the steps of using the variable to determine the identity of the object within the class and using the variable to determine whether the object within the class is equal to the other object based on value semantics is performed by one of:
    a language-dependent compiler;
    a language-independent compiler; or
    a virtual machine.

14. A method for processing code associated with a computer program, comprising:
    identifying an object literal that includes a variable and a modifier associated with the variable, the modifier designating that the variable is to be used for determining the identity of an object associated with the variable and for determining whether the object is equal to another object based on value semantics;
    responsive to identifying the object literal that includes the variable and the modifier associated with the variable:
        using the variable to determine the identity of the object, and
        using the variable to determine whether the object is equal to the other object based on value semantics, said using the variable to determine the identity of the object and said using the variable to determine whether the object is equal to the other object based on value semantics comprising automatically overriding an Equals virtual method and a GetHashCode virtual method such that the overridden Equals virtual method and the overridden GetHashCode virtual method are implemented using the variable and satisfy a required contract associated with the virtual methods.

15. The method of claim 14, further comprising:
responsive to identifying the object literal that includes the variable and the modifier associated with the variable, requiring that the variable be immutable.

16. The method of claim 14, wherein the modifier is one of a programming language keyword or a custom attribute.

17. The method of claim 14, wherein the steps of using the variable to determine the identity of the object and using the variable to determine whether the object is equal to the other object based on value semantics is performed by one of:
 a language-dependent compiler;
 a language-independent compiler; or
 a virtual machine.

* * * * *